May 2, 1939.   C. H. SCHUH   2,156,311
CEMENT FIBER PRODUCT
Filed April 9, 1938   3 Sheets-Sheet 1
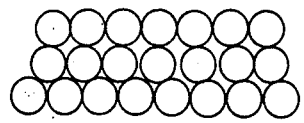
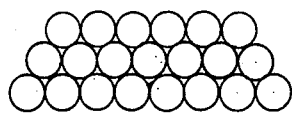
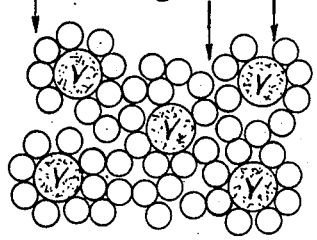
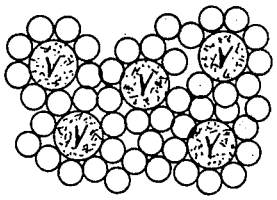
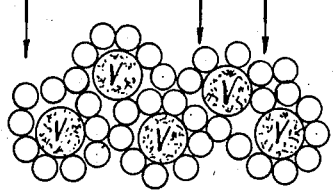
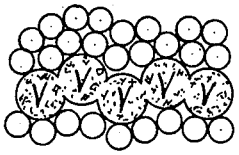
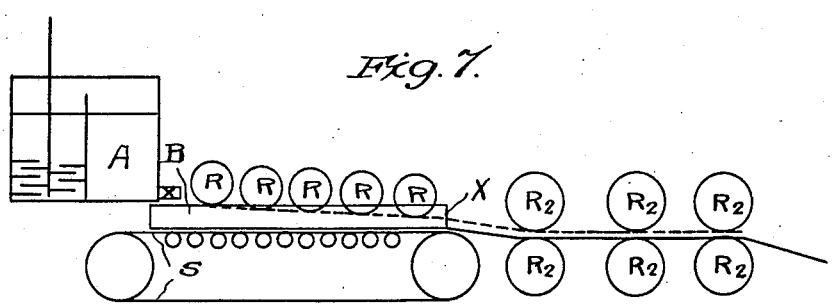
INVENTOR
Charles H. Schuh
BY
ATTORNEY Patented May 2, 1939

2,156,311

UNITED STATES PATENT OFFICE 2,156,311

CEMENT FIBER PRODUCT

Charles H. Schuh, Brooklyn, N. Y., assignor to Bakelite Building Products Co., Inc., New York, N. Y., a corporation of Delaware Application April 9, 1938, Serial No. 201,083

10 Claims. (Cl. 92—21)

This invention relates to cement products, and, more particularly, to waterproofed cement-fibrous products and to a process for producing the same.

It is an object of the present invention to provide a cement-fibrous material which possesses fireproof and waterproof properties, which is resistant to wear and to the effects of weathering, which can be cut with a saw, machined and polished, which has a density that can be varied according to requirements and can be made extremely low or high, and which can be produced at a very low cost.

It is another object of the invention to produce on a mass production scale, a cement-fibrous product having great strength, hardness and uniformity, which may have any particular preferred density within a wide range, and which may include ingredients to improve its resistance to moisture absorption.

A further object of the invention is to produce continuously a cement-fibrous product having superior qualities by the use of a simplified process and inexpensive equipment.

It is still another object of the invention to provide an integral treatment of novel character for reducing the moisture absorption in porous products, particularly in cement-fibrous products.

It is a further object of the invention to provide a simple, inexpensive and novel method of producing low moisture absorption in cement-fiber products.

Another object of the invention is to provide an integral treatment for cement-fiber products of a honeycomb-like character which I denote by the term "Microcell", for increasing the moisture imperviousness thereof, and to provide such products wherein the voids are in effect sealed against capillary action by a water repellent substance, and without filling said voids and whereby the percentage by weight of moisture absorption for a 24 hour period of immersion at normal temperature is greatly reduced by means of relatively small amounts of water-repellent substance, i. e. all out of proportion to the amount of water-repellent substance used.

A further object of the invention is the provision of cement-fiber products, for example, wallboard and the like material, comprising a light weight layer having uniformly distributed voids of non-visible size and substantially free of large, coarse visible fiber and large voids, and which may include a water-repellent ingredient to reduce the moisture absorption thereof but without filling the said voids and without substantially affecting the heat and cold insulating and sound deadening properties of said layer.

An additional object of the invention is to produce a "Microcell" cement-fiber product of low density, including water-repellent particles added to the composition prior to setting, and wherein said particles so arrange themselves in the walls thereof as to substantially seal the structure against capillary action and thereby to greatly reduce the percentage of moisture absorption by means of relatively small amounts of water-repellent particles, yet without affecting the total volume of voids that would be obtained were such water-repellent particles not included.

The invention also contemplates a process for integrally treating cement-fiber products by means of an unstable emulsion, preferably a paraffin emulsion to provide low moisture absorption in such products.

It is also within contemplation of the invention to provide cement-fiber compositions of weatherproof character containing cellulose fibers and having a density and moisture absorption which can be varied within a wide range, including low density and low moisture absorption.

The invention also contemplates the provision of a practical and economical procedure of a substantially continuous character for accurately molding a panel of cement-fibrous composition, including an integral waterproofing agent having a relatively high density, fine grain, smooth finished surface capable of being polished, possessing waterproof and fireproof qualities and capable of being machined.

It is also within the contemplation of the invention to provide a continuous process of manufacturing cement-fibrous products, including integral waterproofing, having an attractive color effect and surface finish.

Other objects and advantages will become apparent from the following description taken in conjunction with the accompanying drawings, in which:

Fig. 1 is a diagrammatic view of cement particles arranged in random orientation;

Fig. 2 shows a diagrammatic view of cement particles arranged symmetrically;

Figs. 3 and 4 are schematic views of cement particles located around voids loosely and compactly, respectively.

Fig. 5 illustrates a mass of cement particles and voids loosely arranged with respect to each other;

Fig. 6 shows the mass of cement particles and voids after the application of pressure and the stratification of voids;

Fig. 7 depicts schematically, equipment for carrying the present invention into practice;

Figure 8:
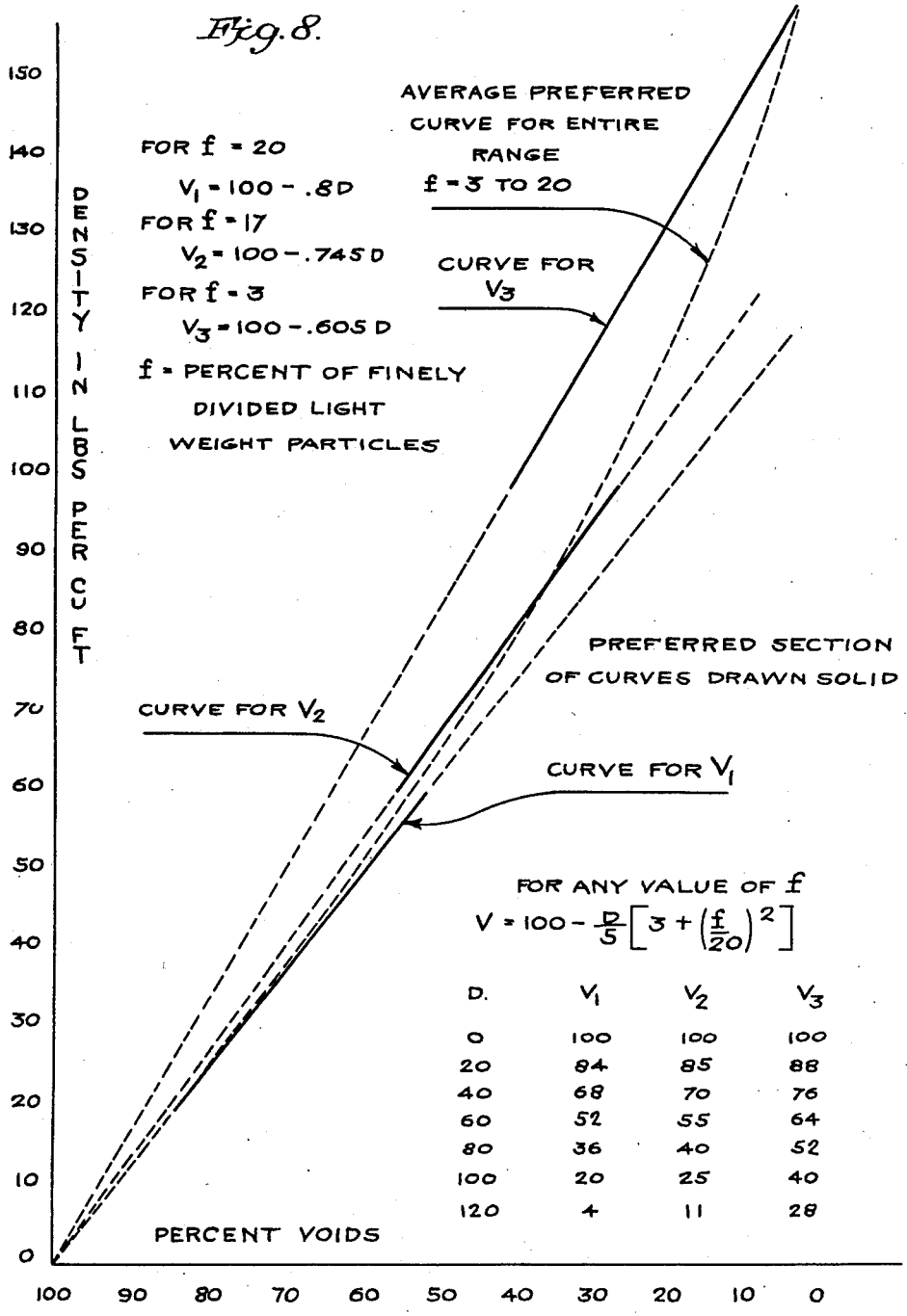
Fig. 8 is a graph showing the values of the percentage of voids for different densities.

Generally speaking, the present invention contemplates the provision of a method of producing a cement-fibrous product in which the orientation of the cement particles or crystals in the finished product is in the form of a pattern, herein termed a honeycombed pattern. This is in direct contrast to the conventional practice of haphazardly mixing cement-fiber compositions and producing products in which the cement particles are without definite orientation and, in fact, are found in layers and stratifications, as in a natural mineral. A supplementary consideration is the effect of the proximity to one another of the cement particles during the time of set, on the production of a definite system of orientation such as a honeycomb pattern, in the final product. To decrease the density of the finished product, it is obvious that the cement particles of a given volume must be dispersed into a greater volume. This must be done without the introduction of voids of visible size, as increased porosity is detrimental. I call this novel type of structure a "Microcell" structure.

I have found that it is possible to provide a dispersion medium in which the cement particles may be dispersed in various controllable degrees of proximity. Moreover, the dispersion can be maintained in a remarkably uniform condition for a period of time covering the time of set. Furthermore, in this dispersion the particles are oriented in such a manner as to form a pattern with continuous united points of contact of cement particles throughout. The importance of these considerations will become apparent as the description of the process develops.

When cement particles are allowed to settle in air, the density obtained is approximately 70 to 100 pounds per cubic foot. The compressibility is considerable. When allowed to settle in water in thin layers, a slightly lower density is obtained. It may be concluded, therefore, that when the particles just touch in uniform distribution, a density of, say, approximately 60 to 90 pounds per cubic foot will be obtained. The range of density is due to the variation in fineness and composition of different samples of cement. In this state the particles will not cement together and the tensile strength may be regarded as zero. A slight compressive action begins to start cementation. For uniform volumetric distribution and cementation of the particles, a density lower than 60 pounds per cubic foot would be impossible.

I have found that it is possible to obtain a cement product hitherto unavailable, having a density as low as 30 pounds per cubic foot and lower, and having an appreciable strength (over 500 pounds per square inch compression) due to cementation. The distribution of cement particles is necessarily different in this case from that obtained by free settling referred to above. I will term the pattern of this latter form of distribution a honeycomb pattern.

In Fig. 1, the small circles designated by the reference character (c) represent cement particles just touching due to free settling. This mass does not cement together effectively. A slight compressive action due to weight or otherwise caused, starts cementation illustrated by Fig. 2. The greater the compression, the greater the strength of the set product. The density of this product is about at least 60 pounds per cubic foot and may be increased to about 120 pounds per cubic foot and more, with an increase in strength as the density increases.

In Fig. 3, the same notation is used for cement particles and the circles marked V represent voids of greater diameter than that of the cement particles. The particles just touch and no effective cementation results. A slight compressive action due to weight or otherwise caused, will effectively cement the particles together as it appears from Fig. 4, showing the resulting structure. The greater the compression, the greater the strength of the finished product. In this case the density may be lower than 60 pounds per cubic foot, depending upon the size of the voids. By generating gas bubbles in cement during the time of set, very light cement products having appreciable strength can be formed. As there is no adhesion between the cement particles and the gas in the voids, the strength is due primarily to the adhesion between the cement particles.

According to the principles of the present invention, relatively light cement structures are formed by embodying minute volumes of appropriate solid materials, which are very much lighter than the cement particles. In addition, the particles of the structure arrange themselves in a characteristic honeycomb pattern capable of cementation at densities below 60 pounds per cubic foot, producing voids of non-visible size. Structures of this type are shown, in Figs. 3 and 4, wherein the cement particles orient about minute flocks V of the added light weight material and form a multiplicity of microscopic voids between the particles of the material and the cement particles. Thus, a much improved structure and even lower densities may be obtained by this method than by the prior processes in which gases have been incorporated to provide a light and porous structure. It is to be noted that it is noted that it is not necessary to have any adhesion between the cement particles and the incorporated material. The most important characteristic of the products of the invention is that they are cement structures, having said added material and voids distributed substantially uniformly throughout the finished product, with the total volume of voids constituting a substantial percentage of the volume of the product. It has been found upon inspection of many samples, that voids in the order of about 20 to 150 microns, with the average size under 100 microns, are to be expected when the structures are made in accordance with this invention.

It is preferred in practice to provide a product containing aggregate particles of greater diameter or length preferably than those of the cement particles and of an extremely low density compared to that of the cement particles. These aggregate particles are constituted of a material which is relatively cheap and which is distributed throughout the honeycomb pattern of the cement composition.

I have found that various fibrous materials when pulped and cut-up to a much greater extent than was customary heretofore and in dilute aqueous suspension are capable of providing a non-settling volume many times greater than that of conventional pulp. During this procedure, the fibrous material consisting of bundles of individual fibres, is torn apart into individual fibers and the fibers themselves are cut and torn to smaller lengths. This is particularly true when natural fiber is used. Since the fibers are very thin and hairlike, if sufficiently torn apart, they have a tendency of curling up and of increasing the volume of settled pulp and of causing a flocking effect of the short fibers, when settled. Although the exact nature of the phenomena underlying the present invention is not fully understood, it is believed that in my fiber processing, additional actions take place, one, an adsorption of water molecules by the fiber (particularly where cellulose), and the other, an electrical phenomenon consisting of electrical charges set up in the fibers. Together, these act to increase the flocking behavior of the short fibers and to increase the resulting non-settling volume of pulp.

It is to be understood that while this theory provides a fairly good explanation of the various phenomena involved in the present process, my invention is independent of any theory. Thus, when, for example, such materials as asbestos, wood, cotton linters, straw, jute, etc., are mechanically pulped as by a sharp, high-speed propeller type of mixer, to a very fine or gelatinous state, they can be made to occupy an extremely large volume in aqueous suspension, and the material itself in that state will have a density of less than one pound per cubic foot. Such a fibrous material when pulped to have in suspension a density in the order of one pound or less per cubic foot, will be found to have a flocculent character, and when sufficiently diluted, will have a natural tendency to de-flock into individually dispersed fibers and to coagulate or coalesce into minute aggregates or flocks when allowed to freely settle from a suspension so diluted. Such materials make excellent flocks V for the structures shown in Figs. 3 and 4. For distributing the pulp throughout the cement in the form of microscopic aggregates V, certain precautions should be followed, as it will be set forth more fully hereinafter.

In carrying the invention into practice, I have found that the natural tendency of such finely pulped fibrous material to coagulate can be used to advantage. Thus, I have discovered that when critical quantities of finely pulped fibers such as, for example, wood fiber, are in intimate mixture with cement in dilute aqueous suspension, and the cement is intimately dispersed throughout the dispersed fiber medium as by high speed mixing, a substantially uniform volumetric distribution of the fiber and cement particles is obtained. When allowed to settle and to coagulate while filtering without seriously disturbing the matrix, the fibers agglomerate into minute flocks of individual fibers arranged in all directions, in the manner previously described, causing the cement particles to orient about the flocks and form the honeycombed pattern of the invention. The result will be a novel structure of large volume, including substantially uniformly distributed minute water-filled spaces between elements of fiber and cement, which may be of a density as low as four pounds per cubic foot. This is in contrast to prior efforts involving a flattening out of the fibers in settling into a plane normal to the direction of settling and forming a small volume of settled material having a laminated character; and to prior attempts involving the use of colloidal fiber forming a dense compact mass without voids. Moreover, the cement-fiber mixture of the invention settles much slower than prior conventional pulps and there is substantially no tendency of the cement particles to segregate toward the bottom of the settled layer by relatively faster settling, which was generally the case with conventional pulp mixtures.

Upon further expression of the liquid phase of the large non-settled volume of pulp of the invention to densities commencing about 20 pounds per cubic foot, the cement particles are brought into sufficiently close relationship to start cementation. Once the matrix is formed, the condensation may be continued where greater strength and densities are desired without destroying the novel honeycomb characteristic of the matrix, there being merely a further reduction in the relative size of the non-visible voids initially created.

Generally speaking, not more than about 20% by weight of fiber pulp should be used. With greater quantities, there is an increasing tendency for the small aggregate areas of fiber pulp to coalesce in places and cause a sort of stratification in such places, which is detrimental. This result is illustrated in Figs. 5 and 6. For best results, this fibrous material should be pulped as fine as possible, the average individual fiber being substantially less than about $\frac{1}{20}$ of an inch, and 90% or more cement used, and the aqueous mixture made under considerable dilution, using substantially 90% or more water. In addition, I preferably provide a minor portion of long, hair-like fiber, which is generally still sufficiently strong to be effective as reinforcement elements. In addition, I prefer that a minor portion at least of the fiber pulp be cellulose fiber to improve filtering.

A preferred method of carrying out the invention is as follows:—An intimate aqueous mixture comprising approximately 9% of very finely pulped wood having a dispersed density of about one pound per cubic foot and a flocculent and coagulating character and approximately 91% of Portland cement at an approximately 96% dilution is maintained in tank A (see Fig. 7). Of course, it is necessary to agitate the mixture or suspension in tank A to prevent settling or coagulation at this point. The mixture is run upon a continuous screen S of approximately 20 mesh, where it settles, coagulates and filters simultaneously. There is a belt B on each side of the screen moving forward with it at about the same speed to prevent the material from running over the sides. The material while filtering, passes under a series of rolls R rotating at a peripheral speed substantially equal to the forward movement of the screen. Each roll is set slightly lower than the preceding one and so exerts a slight compressive action. As explained hereinabove, it is essential to have the successive stages of compression exerted by these individual rolls very gradual so as not to disturb the uniform structure of the matrix during the initial stages of filtration. By the time the material reaches the point X on the screen, over 90% of the original water has been removed and the material has been compressed to a small fraction of its original volume. It now has sufficient strength to be handled and cut into sheets which are run through a second set of rolls $R_2$ to compress the sheets by gradual stages to the final thickness and density. The sheets are then allowed to harden.

After hardening, the sheets may be dipped into an alcoholic dye solution, allowed to dry and the surface is waxed and polished to a beautiful finish.

The finished product may be varied in density from approximately 20 pounds per cubic foot to approximately 170 pounds per cubic foot. For the heaviest material, the cement content may be increased to approximately 97% by weight, while for the lightest products it may be reduced with care to about 85% by weight. The more the material is compressed, the greater, of course, is the strength and density for any given composition.

Due to its high cement content, the product of my invention is in all cases substantially fireproof and does not suffer any deterioration when subjected to weather and moisture. Even the light products are without visible voids because such voids as do exist are microscopic, and are filled with a matrix of minute, light weight particles, for instance, fiber. Of course, the number and the percentage of the voids is relatively large, the volumetric percentage may be as high as 80% of the total volume of the product. This will be further evident from the graph in Fig. 8, showing the percentage of voids at all densities for uniform masses of compressed material of my invention cotaining about 3%, 17% and 20% by weight of finely divided light weight particles. The preferred sections of these curves are drawn solid. For higher densities, a smaller percentage of finely divided light weight particles is desired. A dotted line shows a preferred average curve for the entire range of finely divided light weight particles, from 3% to 20%. It will be observed that to obtain products having a density over about 90 pounds per cubic foot and possessing the characteristic structure of my invention, the percentage of finely divided light weight material should be reduced below 20%. I have found that the relationship between the percentage of voids at any density within the contemplation of the invention and the percentage of finely divided light weight particles particularly below about 20% is expressed with reasonable accuracy by the following formula:—

$$V = 100 - \frac{D}{5}\left[3 + \left(\frac{f}{20}\right)^2\right]$$

Where

V is the numerical percentage of the total volume of the compressed mass constituting voids;

D is the density in pounds per cubic foot;

f is the percentage by weight of finely divided light weight material.

Figure 9:
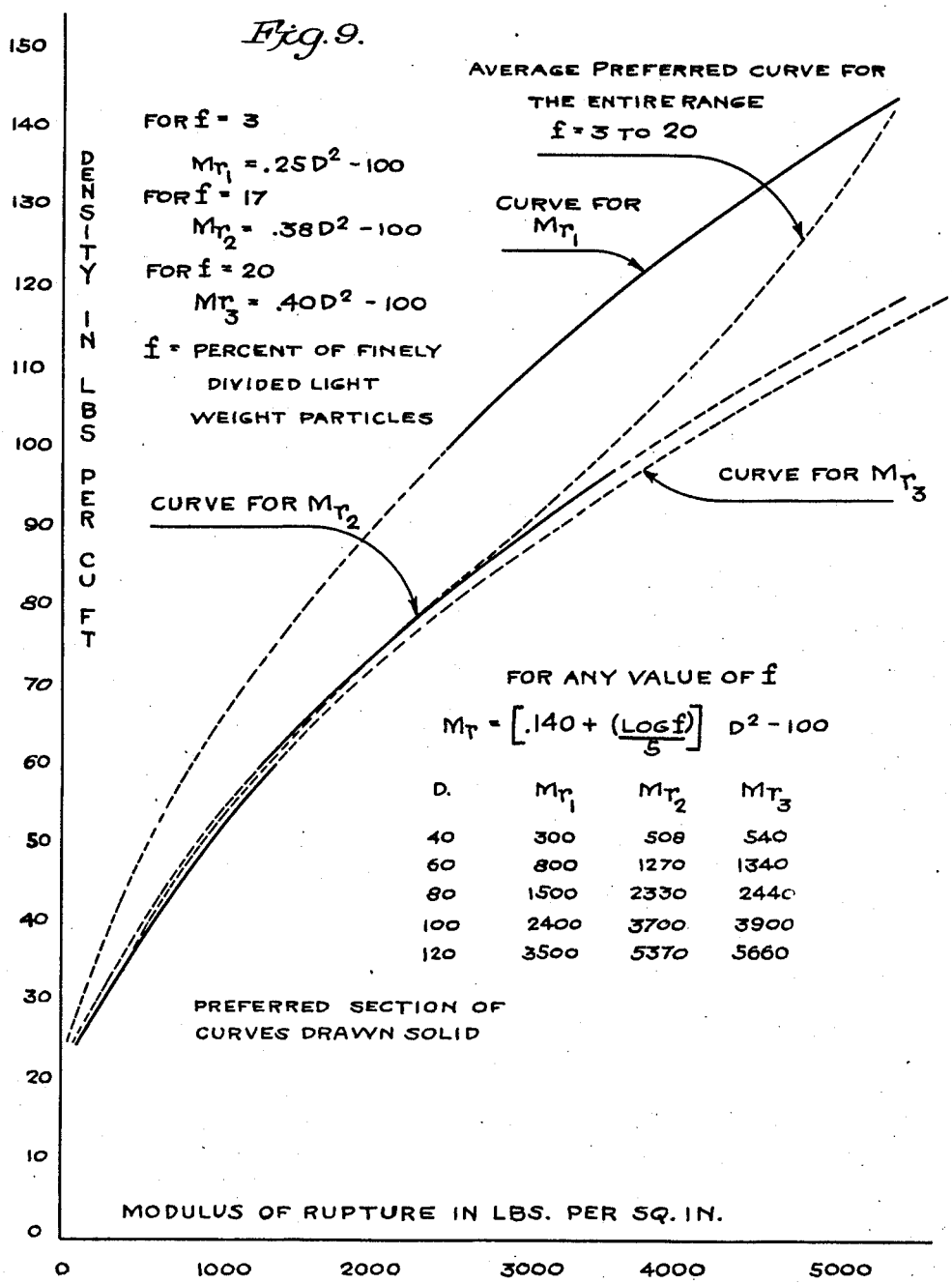
Fig. 9 is a graph showing values of the modulus of rupture at different densities.

The products of my invention will have considerable strength. Fig. 9 depicts a plurality of graphs indicating the value of the modulus of rupture at all densities of the compressed material of my invention containing hydraulic cement particles and about 3%, 17% and 20% by weight of finely divided light weight particles. The solid sections of the curves indicate preferred ranges for use in the particular percentage of finely divided light weight material in question. The average preferred curve for the entire range of percent of finely divided light weight material from 3% to 20% is represented by the dotted line. The graphs are plotted from test values applied to the well known formula for Modulus of rupture:—

$$Mr. = \frac{3\,Wl}{2bd^2}$$

where

Mr. is the modulus of rupture in pounds per square inch,

W is the breaking load in pounds, l is the length of specimen in inches, b is the width of specimen in inches, d is the depth of specimen in inches.

I believe that the relationship between the modulus of rupture and the density and percentage of finely divided light weight particles particularly below about 20%, may approximately be expressed by the following empirical formula:

$$Mr = \left[0.14 + \left(\frac{\log f}{5}\right)\right] D^2 - 100$$

Mr, f, and D have the designations given hereinabove.

The products which are considerably compressed have a very fine texture and when properly stained look like plastic products. They do not show any trace of the appearance of a fiber product and ordinarily would hardly be recognized as cement products. When stained, there is a tendency to develop a grain effect on the surface of these products giving the appearance of wood or other natural materials which have real and distinctive decorative value.

The products have a certain degree of moisture absorption and are adapted to various applications in environment or regions free from excessive amounts of moisture. For environment or regions subject to excessive moisture or water, such as the exterior of buildings like boards, shingles or the like, it has been found that conventional use of integral waterproofing agents such as aluminum soaps and stabilized emulsions were entirely ineffective for reducing the moisture absorption in the present cement-fiber product contemplated by the present invention, having a high percentage of microscopic voids. Obviously, waterproofing may be accomplished by impregnation and complete filling of the voids with a waterproofing substance, but it will be appreciated such conventional methods increase the density of the product to a degree not desired by the present invention and, moreover, the other characteristics of heat and cold and sound insulation possessed by the products of this invention would also be materially affected. I have discovered that by the use of an emulsion, such as those described in my copending application Serial No. 46,742, filed October 25, 1935, novel waterproofing results can be obtained in my "Microcell" structure and without the necessity of filling the microscopic voids to accomplish the new results. It is believed that the particles of my novel emulsion so arrange themselves in the walls of the structure that capillary action is reduced to a point providing the product with material moisture resistance and producing this effect without change in the density of the product or in the effectiveness thereof as heat and cold insulation and as sound insulation material. Thus, I have disclosed in my said copending application the use of an unstable emulsion of materials such as paraffin, rosin, shellac and gums, to obtain desirable waterproofing results, and have particularly emphasized in said application, as well as in my copending application Serial No. 60,447, filed January 23, 1936 the use of paraffin in obtaining satisfactory waterproofing results under conditions of weather exposure such as where my cement-fiber composition takes the form of a roofing or siding.

I have discovered that certain waterproofing agents are more effective as such than others, and that the differences are such as would not ordinarily be expected. Therefore, the particular result desired will largely govern the substance selected for use. For example, by the use of an unstable emulsion of paraffin, I have obtained with about 4% to about 6% thereof, a moisture absorption about as low as about 8%, while the same products without the addition thereof would have a moisture absorption in excess of 40%. An unstable emulsion of rosin in similar quantities permits a moisture absorption between about 24% to 46% greater than that obtained with a paraffin emulsion, dependent upon the conditions of curing of the cement-fiber product. Thus, in certain examples, I have obtained a 24% higher moisture absorption by the use of rosin (than by the use of paraffin), where the cement composition was bone dried before saturating with water and a 46% higher moisture absorption (than by the use of paraffin), where in curing, the product was merely air dried. I have also used an unstable emulsion of "Halowax" (chlorinated naphthalene) and have found it to be effective, the average moisture absorption being about 27% higher than that for paraffin under similar conditions.

It will be observed that by the use of relatively small additions of water-repellent material to my composition, I obtain great reductions in moisture absorption, without destroying the other novel characteristics of the product, i. e. the reduction in moisture absorption is all out of proportion to the amount of waterproofing added. Experiments have definitely demonstrated that these results cannot even be approximated by the use of any of the conventional waterproofing agents, for example, the addition of 5% of a commercially obtainable integral waterproofer would not reduce the moisture absorption of my cement-fiber composition below 40% in a product, for instance, which had a density of 52 pounds per cubic foot. It will likewise be manifest from my copending application Serial No. 60,447, filed January 23, 1936, that with the use of my novel paraffin emulsion, I can obtain in a light-weight shingle structure of my composition, which has a butt edge thickness several times that of the conventional cement-fiber shingle of commerce on a weight for weight basis, a sufficiently low moisture absorption rate to adapt it to weather exposure conditions, and yet satisfy all the other desirable characteristics of appearance, massiveness, light weight, high insulation and strength. In addition to paraffin, I have found upon further experimentation that rosin, etc., while not as effective for such use as paraffin, may also be used where low moisture absorption is an essential factor. Moreover, it will also be noted that bone drying in the curing of my product has the remarkable effect of improving its moisture resistance. The reason for this I do not know, but it is believed to make the waterproofing agent more effective.

For the purpose of giving those skilled in the art a better understanding of my waterproofing method and of the novel and improved products having low moisture absorption produced thereby, the following illustrative examples are given:

Example No. 1

About 100 pounds of asbestos are finely pulped in about 2,000 gallons of water, in the manner previously described, until a large non-settling volume of pulp is obtained. To this aqueous suspension is added about 62 pounds of 50% paraffin emulsion prepared in accordance with the process disclosed in my copending application Serial No. 201,082 filed April 9, 1938 and these are intimately mixed together. About 494 pounds of Portland cement is then added to the mixture and the mixing is continued until a uniform aqueous suspension is obtained. The mixture is then run upon a screen or into a mold with a filtration area, dewatered and condensed under a low pressure, in the order of about 10 pounds per square inch to form a molded product. Thereafter, the product is preferably placed in a curing room and allowed to harden. After curing, the product is allowed to dry thoroughly from all sides and preferably is finally substantially completely dried in a dryer.

The resulting product will be found to have a density of about 40 pounds per cubic foot and its moisture absorption will be about 30%. This is in distinct contrast to a moisture absorption of 70% or more, which would normally be expected if the novel paraffin emulsion were omitted.

A product of this type is suitable for use, for example, as a light weight, fireproof, wall panel material, and has sufficiently low moisture absorption to be used even when it might be occasionally exposed to wet condition.

Example No. 2

About 120 lbs. of news-stock are finely pulped in about 2,000 gallons of water, in the manner previously described, to obtain a non-settling volume between 2 and 3 pounds per cubic foot. To this is added about 60 pounds of a 50% paraffin emulsion prepared in accordance with the process disclosed in my copending application Serial No. 201,082 filed April 9, 1938 and these are intimately mixed together. About 450 pounds of Portland cement are now added to the mixture and the mixing is continued until a uniform aqueous suspension is obtained. The mixture is then run upon a screen or into a mold with a filtration area and dewatered and pressed under very low pressure, say about 10 pounds per square inch to form a molded product. The product is then allowed to harden. There is more than ample moisture in the mass for hydrating the cement so that the product need not be placed in a curing room and it may be allowed to dry out somewhat while curing. A curing room may, however, be used, but it need not be one of high humidity. After curing is completed, the product is allowed to dry out thoroughly from all sides and preferably is finally completely dried in a dryer. This final thorough drying is of great importance and greatly increases the effectiveness of the integral waterproofing agent.

It will be found that the resulting product has a density of about 34 pounds per cubic foot and has the honeycombed structure described above with over 70% of the volume of the product taken up by uniformly distributed microscopic voids. When immersed under water for a 24 hour period, the moisture absorption is only about 19.9% by weight, or $$\left(\frac{19.9}{62.4} \times 34\right)\%$$

by volume. This is extremely low considering that the moisture absorption would normally be over 70%, without the use of the paraffin emulsion. If the product is not bone dried, the moisture absorption, after being only air dried, would be found to be 23.6% by weight.

It will be noted that the reduction in moisture absorption in this case is much greater than in the case of Example No. 1 for the same amount of paraffin. This is believed to be due to a reduction of free alkalinity in the finished product resulting from the use of cellulose fiber in place of the asbestos and the use of a higher percentage of fiber.

This product is an excellent material for use, for example, as a so-called "core material", for wall board, panels and prefabricated wall sections. It makes a very light assembled board, has a low moisture permeability and has good thermal and sound insulating qualities. If, in making this product, it is compressed under a pressure of about 80 pounds per square inch, the density when finished will be found to be about 65 pounds per cubic foot and the moisture absorption only about 8%. Such a product would be useful, for example, as wall board, or facing material, when a minimum amount of moisture penetration is required and where the material is to be weather exposed.

When in this example, three different amounts of fiber are used with the same amount of emulsion and cement, using a high early strength cement like "Incor", however; the amounts of news-stock fiber being 18 pounds, 96 pounds and 120 pounds, respectively, and the products are made under a pressure of about 30 pounds per square inch so that the finished density will be about 48 pounds per cubic foot, the moisture absorption after a six day curing period and after bone drying will be as follows:—

10.2% for the composition containing 120 pounds of news-stock.
12.3% for the composition containing 96 pounds of news-stock.
22.9% for the composition containing only 18 pounds of news-stock.

This illustrates the effect of the cellulose fiber as pointed out above.

Example No. 3

60 pounds of a rosin emulsion (50%) prepared in accordance with the process disclosed in my copending application Serial No. 201,082, filed April 9, 1938, is substituted for the 60 pounds of paraffin emulsion of Example No. 2. The product is made in the same manner and bone dried.

The resulting product has a density of about 34 pounds per cubic foot and a moisture absorption of about 24.7% (by weight) or $$\left(\frac{24.7}{62.4} \times 34\right)\%$$

by volume. This is about 24% higher than the result obtained by the use of paraffin under similar conditions in Example No. 2, but still a very low moisture absorption for such a low density product. If the product is merely air dried, the moisture absorption will be about 34.6% by weight.

This product is also suitable for use, for example, as a core material, but does not have quite as much moisture resistance as the material of Example No. 2. The rosin in this case functions as a binding agent as well as a water-repellent agent, and increases the strength of the product somewhat, as well as improving the general working characteristics, including ease of sawing, nailing, etc.

Example No. 4

In this example, the fibrous portion is constituted of 67 lbs. asbestos and 33 pounds of news-stock. This is processed as in Example No. 1, using with it the same amount of Portland cement (494 pounds) but only half the amount of paraffin emulsion, that is 31 pounds. This aqueous suspension is dewatered and condensed under a pressure of about 100 pounds per square inch.

After curing and drying as before, the product will be found to have a density of about 78 pounds per cubic foot and a moisture absorption of about 28%. Such a product is useful generally for boards, trim, flooring, etc., where the material is not used in direct exposure, but when a moderately low moisture absorption is nevertheless desirable.

A further feature of the invention resides in the advantages of my novel "Microcell" structure in the formation of composite products. Thus, I may run or float upon the screen S of Figure 7 or form in suitable molds provided with a filter face, strata of the wet composition of the invention, said strata being of similar compositions of different densities or of different compositions, all, however, having the novel "Microcell" characteristics when dewatered and condensed to the desired degree. Also, one or more of the strata may include the novel waterproofing characteristics hereinabove set forth. Composite structures of "Microcell" compositions made according to these processes are found not to require the use of an additional adhesive layer between strata.

Moreover, two or more strata of the composition may be preformed into wet matrices and brought together to form an integral structure. However, I have found that the "flotation" process aforesaid produces a far superior bond between adjacent strata, this being particularly true where any such stratum includes my novel waterproofing composition containing a water-repellent substance naturally non-adhesive.

It is also possible to use a preformed finished "Microcell" layer as a base upon which to apply a further quantity of my novel "Microcell" composition to form, when set, an integral layer with the base layer. Furthermore, a preformed wet or dry "Microcell" layer may also be applied to such a base, or layers of other materials, dry or wet, may be used, it being contemplated to employ suitable cementing materials, for example, a soluble silicate, hot asphalt or pitch, a cold water emulsion of asphalt, a phenol-resin cement, or a water-resistant glue, where such are found to be desirable.

It is to be noted that the surface of a finished "Microcell" base fabricated in the manner previously described, contains countless numbers of individual fibers that project outwardly substantially perpendicular to the surface, this result being made possible by the non-laminated character of the fiber structure and the orientation of fibers in all directions. Such characteristics may be more readily observed by sanding the surface of "Microcell" material to a smooth finish, for example, by the use of emery paper that is not too fine. This novel surface condition provides an excellent base upon which to receive the aforesaid overlay. Thus, where such additional layer is a preformed one of similar material to the base layer, the minute hair-like fibers of the adjacent strata, when brought into contact, interlock, and with only a very slight amount of binding agent there results a bond of appreciable strength. Moreover, the bond that is created has considerable resiliency as compared with that obtained between two perfectly flat, smooth surfaces. The fibers in my novel bond also have a cushioning characteristic in bonding, as well as a property of increasing the contact between the two surfaces, and assist in obtaining greater strength in the bond. Furthermore, due to the fiber arrangement, the coefficient of friction between the two bonded surfaces is substantially increased and it will be appreciated that such arrangement also increases the strength of the bond in shear when the two surfaces are cemented together.

Furthermore, I have found that a surface as above described provides improved results even when used as a base upon which preformed or other layers of materials not having the characteristics of my invention are applied. In such instances, the contact is between a pair of surfaces, one of which has the preferred characteristics. The perpendicular fibers of the preferred face interlock with the combining material, for example, in the voids of the surface of the material being applied thereto, unless, of course, that surface is absolutely smooth, which is rarely the case. In any event, the projecting fibers form reinforcing elements across the plane of contact and increase the strength of any bond that is created.

In using certain cement, for example, a soluble silicate cement, for binding an additional stratum to my novel base surface, it is possible to use a cement of very low concentration and yet obtain a good bond. When the concentration of the cement is lowered, the viscosity is also very appreciably reduced and this makes possible a much more uniform spread, as well as an economical use of the binding agent. It will be understood that where an integral bonding agent exists in the layers (wet or dry) to be laminated, or the materials of said layers are themselves binders, the application of a binding medium at the joint may not be necessary.

It also has been found that where the product includes at least one layer that is waterproofed according to my novel process, it greatly assists in maintaining a cemented bond of a water-soluble binding agent such as sodium silicate.

According to the foregoing features, it is therefore contemplated to make composite structures including strata of various characteristics. Obviously, one or more strata of such structure may comprise a cork layer, preferably of the character described in my copending application Serial No. 46,742, and which may be combined as a preformed finished layer or as a wet composition or matrix. Obviously, the composite structure may include as many layers and combinations thereof as desired.

From the foregoing description, it is obvious that the same process may be applied to the production of a variety of materials in a variety of ways and I do not wish to limit myself to the particular procedure herein described which is particularly adapted for the production of wall board and the like where continuous volume production is important. One skilled in the art can readily see that a great variety of products can be made by simply filling with properly prepared dilute aqueous suspension individual molds provided with areas of filtration, settling and coagulating said suspension during filtering, and appropriately and carefully compressing the matrix into the mold to the proper density.

The present invention is not to be confused with old processes involving the general scheme of filtration and compression in connection with the production of cement-fibrous compositions and straw board and press board generally. There may be a close similarity of equipment and procedure and even materials used, between the process contemplated by the present invention and other processes heretofore used or proposed, nevertheless fundamental differences exist which are evident from the new results obtained by the present invention. Thus, I preferably use less than about 20% of fibrous material, whereas processes heretofore proposed use substantially more than 20% by weight. Then again, I use fibrous material which is very finely pulped, and bring this material to a flocculent state having a coagulating tendency resulting in a large non-settling volume and having a density of the order of about one pound per cubic foot. Moreover, in my process, the individual fibers are about 1/20 of an inch and less, whereas practically all previous processes aim to obtain and use the longest fibers possible, using fibers 1/8 and sometimes 1/4 of an inch in length as they rely on the strength obtained by the matting of the individual long fibers. In practically all cases where wood fiber and the like was used, a resinous or other organic binding material was used, which is not necessary in the present case. The cement fibrous composition generally employed asbestos as the fibrous material. In fact, the art paid a large premium for the longest fiber which made the best prior products and the art often used substantially 20% to 50% by weight of such fibrous material. As a result of the high pressures employed to produce a satisfactory product, such as cement-asbestos products were not only of high density, but were limited to high density products due to lamination and non-uniform structure, and due to the absence of the coagulating fiber of large, non-settling volme. When a resinous binder was used, often 80% by weight and more of the fibrous material was used. With the use of such large percentages of fibrous material, the amount of pressure required in prior procedures to compress the material into a dense sheet became enormous as the thickness of the sheet was increased.

Accordingly, I wish to state that the principle on which my process is based is in direct contrast to the principle on which prior processes heretofore proposed and used are based.

It is to be observed that other cementitious materials may be used in my process in place of Portland cement, for example, other hydraulic or other cements as natural cement, Roman cement, gypsum, magnesite, etc. Likewise, a number of fibrous materials can be used instead of those mentioned hereinabove.

It is also to be noted that the present invention provides a novel product having a honeycomb structure comprising countless microscopic voids or cells distributed therein. When examining a thin section of the product of the invention under the microscope, this honeycomb structure may be clearly observed and will appear to be similar to some extent to a sponge with minute cells. The microscopic examination also demonstrates the marked difference between the conventional high density materials and the products embodying the principles of the present invention. It is noteworthy that a thin section of a "Microcell" cork material when examined under the microscope, shows a characteristic micro-cellular structure strikingly similar in appearance to the products of the invention. While the lower density materials embodying the invention, (such as having a density of about 36 pounds per square foot), and those of a density of about 75 pounds per square foot, are very similar in their structure, the difference between the fineness of the voids is clearly apparent from the microscopic examination. This clearly indicates that although the average size of the voids in the products of the invention may be different at the various densities and coarser voids may be observed particularly in the lower density products, the characteristic structure of a fine grained nature is retained throughout the entire range of densities contemplated by the present invention.

The present application is a continuation in part of my co-pending application Serial No. 3,578, filed January 26, 1935.

I claim:

1. A compressed cement-fiber composition of substantially uniform physical character comprising cement particles and finely beaten fibrous material substantially in the form of individualized fibers of an average length up to about 1/20 inch; said fibers and cement particles being in substantially uniform volumetric distribution, and said fibers lying in substantially all directions and presenting with said cement particles a bonded composition substantially free of parallel matting of the fiber into planes of cleavage, said arrangement of fibers being such that there results in the composition a substantially microcellular structure comprising a multiplicity of substantially uniformly distributed substantially microscopic voids constituting at least 30% of the volume of the composition.

2. A compressed cement-fiber composition of substantially uniform physical character comprising principally cement particles and from about 3% to about 20% by weight of the composition, finely beaten fibrous material substantially in the form of individualized fibers of an average length up to about 1/20 of an inch; said fibers and cement particles being in substantially uniform volumetric distribution, and said fibers lying in substantially all directions and in minute flocks of individual fibers and presenting with said cement particles a bonded composition of substantially uniform physical character; said arrangement of fibers being such that there results in the composition a substantially micro-cellular structure comprising a multiplicity of substantially uniformly distributed substantially microscopic voids.

3. A compressed cement-fiber composition having substantially uniform physical character comprising cement particles and finely beaten fibrous material in the proportion of at least about 80 parts by weight of cement to not more than about 20 parts by weight of fibrous material substantially in the form of individualized fibers of an average length of about 1/20 of an inch and less; said fibers and cement particles being in substantially uniform volumetric distribution and said fibers lying in all directions and presenting with said cement particles a bonded composition substantially free of parallel matting of the fibers into planes of cleavage; said arrangement of fibers being such that there results in the composition a substantially microcellular structure comprising a multiplicity of substantially uniformly distributed microscopic voids of an order ranging from about 20 to about 150 microns in size and constituting at least 30% of the volume of said composition.

4. A compressed cement-fiber composition having substantially uniform physical character comprising cement particles selected from the group consisting of Portland cement, natural cement, Roman cement, gypsum, and magnesite; and finely beaten fibrous material substantially in the form of individualized fibers of an average length less than about 1/20 of an inch, selected from the group consisting of asbestos fiber, cellulose fiber, wood, cotton linters, straw, and jute; said cement particles and fibers being in the proportion of at least about 80 parts by weight of cement to not more than about 20 parts by weight of fibrous material, and being in substantially uniform volumetric distribution; and said fibers lying in all directions and presenting with said cement particles a substantially continuous bonded composition substantially free of parallel matting of the fiber into planes of cleavage, said arrangement of fibers being such that there results in the composition a substantially micro-cellular structure comprising a multiplicity of substantially uniformly distributed microscopic voids.

5. A compressed cement-fiber composition comprising cement particles and finely beaten fibrous material in amount not more than about 20 parts by weight of the composition and substantially in the form of individualized fibers of an average length of about 1/20 of an inch and less; said fibers and cement particles being in substantially uniform volumetric distribution and said fibers lying in all directions and presenting with said cement particles a substantially continuous bonded composition substantially free of parallel matting of the fibers into planes of cleavage; said arrangement of fibers being such that there results in the composition a substantially micro-cellular structure comprising a multiplicity of substantially uniformly distributed microscopic voids constituting at least 30% of the volume of said composition; and a water repellent substance distributed substantially throughout said composition without detrimentally affecting the aforesaid percentage of voids, said substance acting as a substantial preventative of capillary action.

6. A compressed cement-fiber composition having substantial strength and water resistance comprising cement particles and finely beaten fibrous material in the proportion of at least about 80 parts by weight of cement to not more than about 20 parts by weight of the fibrous material substantially in the form of individualized fibers of an average length up to about 1/20 of an inch; said fibers and cement particles being in substantially uniform volumetric distribution and said fibers lying in all directions and presenting with said cement particles a substantially continuous bonded composition substantially free of parallel matting of the fibers into planes of cleavage, said arrangement of fibers being such that there results in the composition a substantially micro-cellular structure comprising a multiplicity of microscopic voids constituting at least about 30% of the volume of said composition; and a water repellent substance in amount less than about 6% by weight of the composition, distributed throughout said composition, and comprising a water emulsion of a substance selected from the group consisting of paraffin, rosin, shellac, gum, chlorinated naphthalene.

7. A compressed cement-fiber composition having substantial strength comprising hydraulic cement particles and finely beaten fibrous material substantially in the form of individualized fibers of an average length less than about 1/20 of an inch and in the proportion of at least 80 parts by weight of cement to not more than about 20 parts by weight of the fibrous material; said fibers and cement particles being in substantially uniform volumetric distribution and said fibers arranged in all directions and presenting with said cement particles a substantially continuous bonded composition of substantial strength; and said arrangement of fibers being such that there results in the composition a substantially micro-cellular structure comprising substantially a large number of uniformly distributed microscopic voids constituting at least about $$100 - \frac{D}{5}\left[3 + \frac{(f)^2}{20}\right]$$

percent of the total volume of said composition, and said composition having a modulus of rupture of approximately $$\left[0.14 - \frac{\log f}{5}\right]D^2 - 100$$

pounds per square inch and greater, wherein D is the density in pounds per cubic foot and f is the percentage of the finely beaten fibrous material.

8. A compressed cement-fiber composition having substantial strength and uniformity, comprising cement particles and finely beaten fibrous material susbtantially in the form of individualized fibers of an average length less than about $\frac{1}{20}$ of an inch, and in the proportion of about 85% to about 97% by weight of cement to about 15% to about 3% by weight of fibrous material; said fibers and cement particles being in substantially uniform volumetric distribution and said fibers being arranged in all directions and presenting with said cement particles a substantially continuous bonded composition substantially free of parallel matting of the fiber into planes of cleavage; said arrangement of fibers being such that there results in the composition a substantially micro-cellular structure comprising a large number of substantially uniformly distributed substantially microscopic voids; said composition having a density between 30 to 170 pounds per cubic foot and a compression strength greater than 500 pounds per square inch.

9. A compressed cement-fiber composition having substantial strength and uniformity comprising cement particles and finely beaten fibrous material substantially in the form of individualized fibers of an average length about $\frac{1}{20}$ of an inch and less, and in the proportion of about 90% by weight and more of cement to about 10% by weight and less of fibrous material; said fibers and cement particles being in substantially uniform volumetric distribution and said fibers lying in all directions and presenting with said cement particles a substantially continuous bonded composition of substantial strength; said arrangement of fibers being such that there results in the composition a substantially microcellular structure comprising a large number of substantially uniformly distributed substantially microscopic voids; said composition having a density less than 100 pounds per cubic foot and a compression strength greater than about 1,000 pounds per square inch.

10. The process of making a cement-fiber composition having strength which comprises mechanically beating fibrous material having an average fiber length of less than about $\frac{1}{20}$ of an inch in an aqueous mixture to fibrous material characterized by a non-settling volume of the fiber of about one pound per cubic foot and less, dispersing at least about 80 parts by weight of cement particles uniformly through said fibrous mixture of at least 90% dilution, to not more than about every 20 parts by weight of fiber, adding a water emulsion of a water-repellent material to the mixture, dewatering said aqueous mixture to produce a matrix of agglomerated fibrous material containing cement particles distributed therein, and compressing the said matrix to a desired density to form a product of compressed structure having the fibers arranged in all directions and substantially free of parallel matting of the fiber into planes of cleavage and capable of setting and curing in the normal manner of a cement product to a compressed micro-cellular composition having high strength and uniformity and substantial resistance to capillary action.

CHARLES H. SCHUH.